# UNITED STATES PATENT OFFICE.

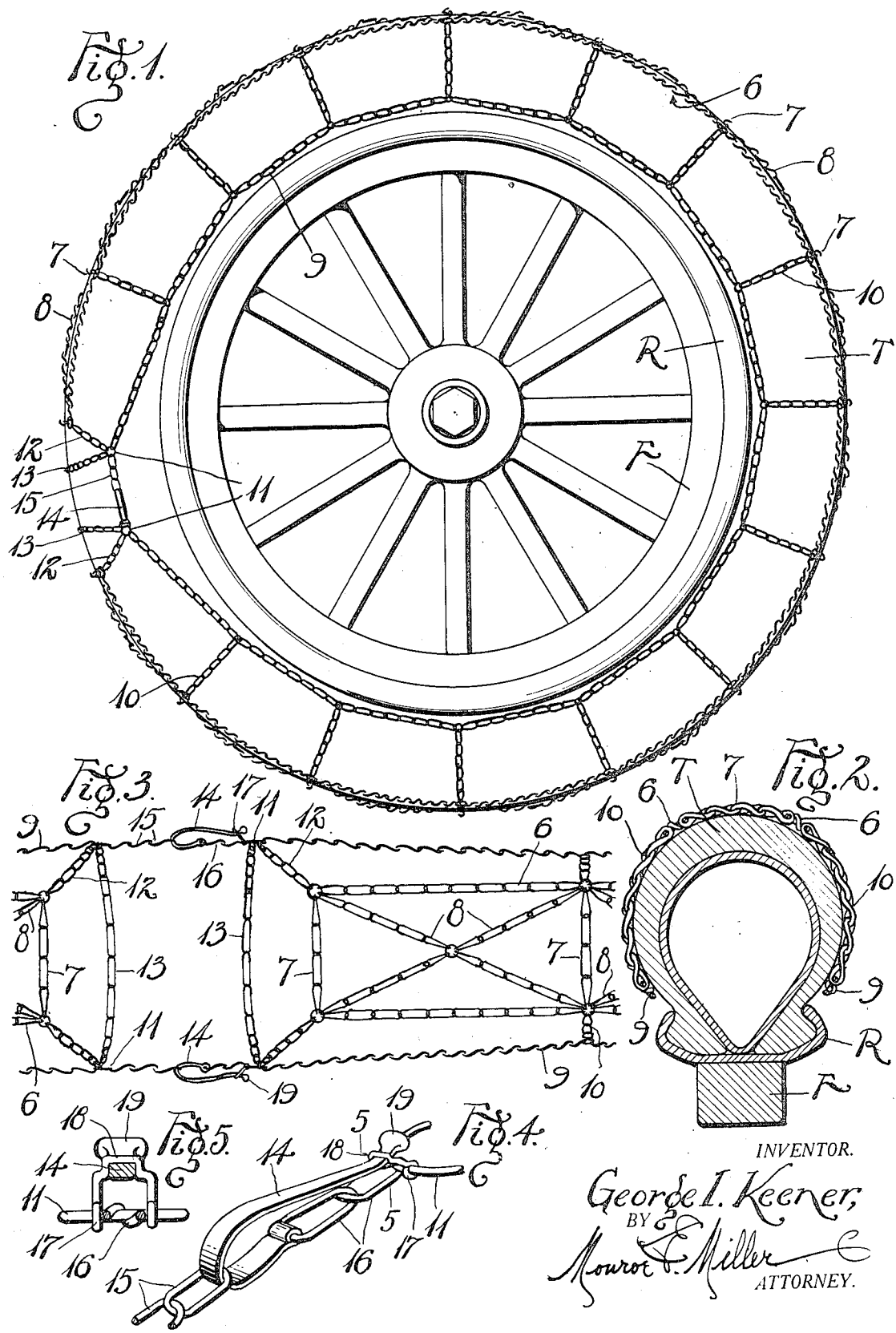

GEORGE I. KEENER, OF WESTON, WEST VIRGINIA.

ANTISKID-CHAIN.

1,297,476.  Specification of Letters Patent.  Patented Mar. 18, 1919.

Application filed May 8, 1918. Serial No. 233,211.

*To all whom it may concern:*

Be it known that I, GEORGE I. KEENER, a citizen of the United States, and resident of Weston, in the county of Lewis and State of West Virginia, have invented certain new and useful Improvements in Antiskid-Chains, of which the following is a specification.

The present invention relates to anti-skid chains used upon the tires of vehicle wheels, and aims to provide such a device of novel and improved construction whereby to enhance traction on roads or pavements that are wet, muddy or otherwise dangerous to motor vehicle traffic.

Another object of the invention is the provision of an anti-skid chain which is constructed to provide an effective anti-slip tread and to prevent, as much as possible, the contact of the tire with the surface traversed.

A further object is to provide such a chain having its end portions constructed in a novel manner and provided with effective means, so that the chain can be drawn taut on the tire and securely held in place against accidental displacement.

The invention also has for an object the provision of an anti-skid chain which can be quickly applied to and removed from the tire without the use of implements for that purpose and without the liability of tearing the finger nails or otherwise injuring the hand.

With the foregoing and other objects in view, which will be apparent as the inventon is better understood, the invention resides in the construction and arrangements of parts hereinafter described and claimed, it being understood that changes can be made within the scope of what is claimed without departing from the spirit of the invention.

The invention is illustrated in the accompanying drawing, wherein—

Figure 1 is a side elevation of a vehicle wheel with the improved anti-skid chain applied to the tire.

Fig. 2 is an enlarged cross section.

Fig. 3 is a fragmentary plan view of the chain in the position as when on the tire, and showing the connections between the ends thereof.

Fig. 4 is a perspective view of one of the coupling hooks.

Fig. 5 is an enlarged cross section on the line 5—5 of Fig. 4.

In carrying out the invention, the chain embodies an elongated mat or covering to fit the tread surface of the tire T, and said mat includes a pair of parallel chain sections 6 of a length slightly less than the circumference of the tire, and cross chain sections 7 connecting the chain sections 6 at their ends and spaced intervals from end to end. Within each of the rectangles formed by the chain sections 6 and 7 is a pair of crossed diagonal chain sections 8 connected at their ends to the junctures or connections of the chain sections 6 and 7. The mat is thus of meshed construction and has the side chain sections 6 extending longitudinally, and the transverse and oblique chain sections between them, so that skidding in any direction on the road or pavement, is prevented. The mat is of a width, or its chain sections 6 are so spaced apart, that said chain sections bear on the road or pavement, or in other words, all of the chain sections of the mat are at the tread surface of the tire, thus preventing, as much as possible, the tire from coming in contact with the underlying surface, thus preserving the life of the tire, because the meshes of the mat are of sufficiently reduced area for that purpose. The mat also provides a practically continuous anti-slip traction tread for the tire, whereby to prevent the wheel turning in jerks as when the sections of the chain only engage the road or pavement at intervals. The longitudinal chain sections 6 prevent skidding sidewise, and the transverse chain sections 7 prevent longitudinal skidding and the spinning of the wheel, while the crossed diagonal chain sections assist in both directions, and also make the grip with the road or pavement continuous. The V-shaped portions formed by the chain sections 8 greatly facilitate traction and speed.

In order to hold the mat in place on the tread surface of the tire, a pair of longitudinal retaining chain sections 9 are employed, and are disposed at the opposite sides of the tire near the rim R and felly F. The chain sections 9 are connected with the chain sections 6 of the mat at the junctures of the chain sections 6, 7 and 8, excepting at the ends of the mat, by radial stay chain sections 10. The chain sections 9 are therefore spaced inwardly from the tread and have the function with the stays 10 of holding the mat in place against transverse displacement on the tread surface of the tire.

As an effective means for drawing the chain taut on the tire, the end portions of the chain are of special formation. Thus, the terminals of the chain sections 9 project beyond the terminals of the mat, as seen in Figs. 1 and 3, and extend tangentially outward from the circles of the chain sections 9 when the chain is in place on the tire, as seen in Fig. 1. Short diagonal draft stays or chain sections 12 are connected to the end corners of the mat at the junctures of the respective chain sections 6, 7 and 8, and these stays 12 at each end of the mat diverge and extend therefrom inwardly to the ends of the respective chain sections 9. In this way, the terminals of chain sections 9 extend outwardly at each side of the tire while the corresponding stays 12 extend inwardly, and said stays and terminals are connected where they meet to rings 11, there being a pair of these rings at each side between which the coupling means is disposed. If desired, transverse chain sections 13 can be terminally connected to the rings 11 to extend across the tread surface of the tire between the spaced ends of the mat to prevent a break in the grip of the chain between the ends of said mat.

The coupling at each side of the chain between the pair of rings 11 includes a coupling hook 14 pivotally connected to one ring 11, and a series of links 15 connected to the other ring 11 for the engagement of said hook. The hook 14 is connected to its ring 11 by links 16, to one of which the hook is pivoted, and the bill of the hook extends back beyond the pivot, so that when the hook is swung open toward the links 15, the bill can be readily inserted through any one of the links 15, thus providing an adjustment to assure of the chain being contracted tightly on to the tire. When the bill of the hook is thrust through one of the links 13, it can be readily swung back, and will thus provide a leverage for pulling the rings 11 toward one another to contract the chain, the hook assuming the position shown in Figs. 3 and 4, with the link 15 seated in the bight or loop of the hook. The pulling strain will naturally tend to hold the hook in its closed position, but to prevent accidental opening of the hook, a catch 17 is provided. This catch 17 is of loop form and has eyes at its ends pivotally embracing the ring 11 to which the hook is connected, with the catch 17 astride the link 16 which engages said ring. The free or intermediate portion of the catch 17 has an offset portion 18 in which the bill of the hook is seatable outwardly when the catch is swung over the end of the hook which is provided with a rounded knob or head 19. When the bill of the hook is pressed against the ring 11 by hand, the catch 17 can be readily swung over or off of the end of the hook, the opening of the catch being large enough for the passage of the knob 19, but when the hook is seated in the offset notched portion 18 of the catch 17, as seen in Figs. 4 and 5, the accidental releasing of the hook is prevented due to the fact that the catch can not swing away from the hook, because the knob 19 is too large to pass through the notched portion 18. It thus requires manual effort to uncouple the ends of the chain, the hooks being first pressed against the tire and the catches 17 then being swung away from the hooks, which is not now prevented because the knobs 19 have been moved inwardly so that the notched portions 18 do not engage them. The hooks can then be swung toward the links 15 to release them, and disconnect the ends of the chain. It is evident that by engaging the hooks 14 in the various links 15, the slack of the chain can be taken up and the chain adjusted to be drawn tightly onto the tire so as not to slip thereon. As above explained, the closing of the hooks 14, after being inserted through the links 15, pulls the ends of the chain toward one another, to contract the chain on the tire, and the catches 17 avoid any possibility of the accidental opening of said hooks.

Particular attention is directed to the fact that the stays 12 and terminals of the chain sections 9 converge to the rings or junctures 11 thereof, beyond the ends of the mat at points between the circles of the mat and retaining chain sections 9, whereby when the rings are pulled or drawn toward one another by the coupling hooks 14, the draft or strain will be properly distributed to both the mats and chain sections 9. The ends of the chain sections 9 being pulled toward one another brings the stays 10 under tension to draw the mat against the tire, and the stays 12 being pulled toward one another will stretch the mat and draw its ends inwardly tight against the tire. The strains are transmitted from the stays 12 to the chain sections 6, 7 and 8 of the mat at the ends thereof, and it will be noted that these chain sections diverge from the corners where the stays 12 are connected so as to distribute the strain effectively, applying it to the ends of the chain sections 6 to stretch the mat, and also applying it to the ends of the endmost chain sections 7 to hold them against the tire, whereas the chain sections 8 at the ends form almost direct extensions of the stays 12 to the opposite chain sections 6, as seen in Fig. 3. By this arrangement, the chain is firmly held in place when its ends are drawn toward one another, and the chain will therefore not become displaced even when subjected to hard usage.

Having thus described the invention what is claimed is:

1. An anti-skid device comprising a chain mat of a length to fit and nearly reach around the tread surface of a tire, a pair of retaining chain sections at opposite sides of and longer than the mat, stays connecting said chain sections and mat, stays diverging from the ends of the mat, and extending inwardly, the terminals of said chain sections extending outwardly and being connected to the last named stays, and coupling means connected to the last named stays and terminals for drawing the ends of both the mat and retaining chain sections toward one another.

2. An anti-skid chain comprising a mat having a pair of longitudinal chain sections, cross chain sections connecting the ends thereof and intermediate points at intervals, and diagonal chain sections connected to the junctures of said chain sections; a pair of side retaining chain sections having their terminals extending beyond the ends of the mat; stays connecting the last named chain sections and the longitudinal chain sections at their junctures, with the others; diverging stays connected to the ends of the mat at the junctures of the respective chain sections thereof and extending inwardly and connected to the terminals of the retaining chain sections; and coupling means connected to the junctures of the last named stays and terminals for drawing them toward one another.

In testimony whereof, I hereunto set my hand this 2nd day of May, 1918.

GEORGE I. KEENER.